United States Patent
Hattori et al.

(10) Patent No.: US 8,602,489 B2
(45) Date of Patent: Dec. 10, 2013

(54) ROOF APPARATUS FOR VEHICLE

(75) Inventors: Takanori Hattori, Aichi-ken (JP); Tetsuya Hirata, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/542,039

(22) Filed: Jul. 5, 2012

(65) Prior Publication Data

US 2013/0015684 A1 Jan. 17, 2013

(30) Foreign Application Priority Data

Jul. 12, 2011 (JP) ................................. 2011-154137

(51) Int. Cl.
 *B60J 7/00* (2006.01)
(52) U.S. Cl.
 USPC ........................................................ 296/213
(58) Field of Classification Search
 USPC ........................................................ 296/213
 See application file for complete search history.

(56) References Cited

U.S. PATENT DOCUMENTS 7,950,732 B2 * 5/2011 Clephas et al. ............... 296/213
8,348,336 B2 * 1/2013 De Bie .......................... 296/211

FOREIGN PATENT DOCUMENTS

| JP | 2001-138745 | 5/2001 |
| JP | 2006-131161 | 5/2006 |

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus for a vehicle includes a function part which is movable along a guide rail provided at a roof portion and supports a movable panel, a drain channel extending in the vehicle width direction and movable along the guide rail, and a stopper provided at the guide rail at a rear side, wherein the stopper allows the drain channel to be in contact therewith for stopping a movement of the drain channel and the drain channel allows the function part to be in contact therewith for stopping a movement of the function part, and the drain channel includes an interposition portion including a contacting surface defined by a contact with the stopper and a contacted surface defined by a contact with the function part, and projected images of the contacting surface and the contacted surface are at least partly overlapped each other in the vehicle front/rear direction.

5 Claims, 6 Drawing Sheets

F I G. 3
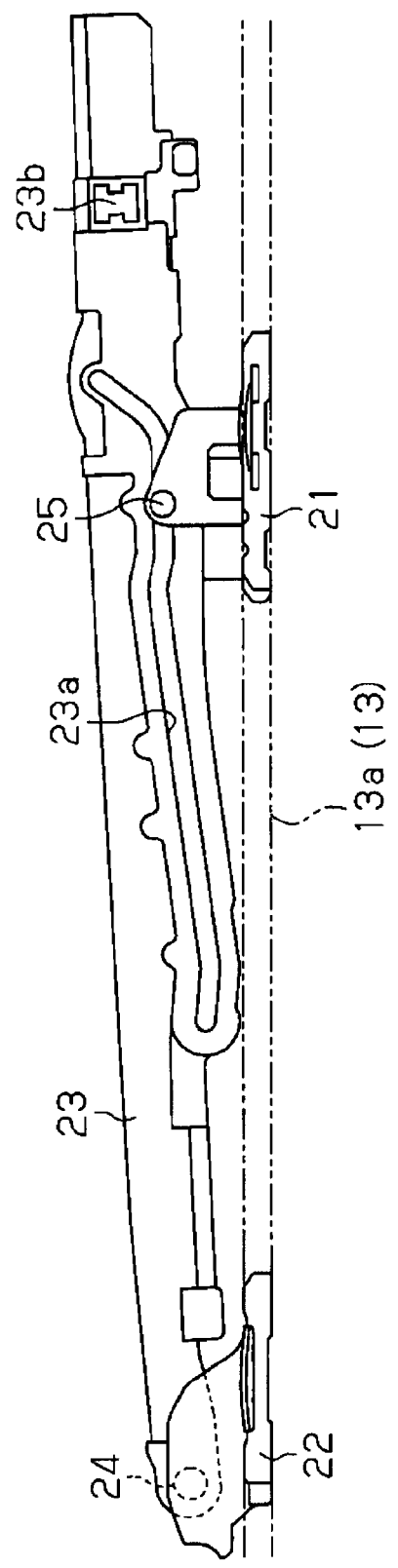

ROOF APPARATUS FOR VEHICLE

CROSS REFERENCE TO RELATED APPLICATIONS

This application is based on and claims priority under 35 U.S.C. §119 to Japanese Patent Application 2011-154137, filed on Jul. 12, 2011, the entire content of which is incorporated herein by reference.

TECHNICAL FIELD

This disclosure generally relates to a roof apparatus for a vehicle.

BACKGROUND DISCUSSION

A known roof apparatus for a vehicle is disclosed in JP2006-131161β (hereinafter referred to as Patent reference 1). The roof apparatus for the vehicle disclosed in the Patent reference 1 is provided with a front portion slider and a rear portion slider each of which is arranged in a slidable manner in a vehicle front/rear direction along a guide rail provided at an edge portion, in a vehicle width direction, of an opening portion formed at a roof portion of a vehicle body. The roof apparatus for the vehicle disclosed in the Patent reference 1 is also provided with a supporting member supporting a movable panel connected to each of the front portion slider and the rear portion slider, and opening and closing the opening portion. The front portion slider, the rear portion slider and the supporting member constitute function parts. In a case where the movable panel is in a fully-opened state and while the rear portion slider is moved in the vehicle rear direction, the movable panel performs a tilt-down operation. When the movable panel is in a tilted-down state and the rear portion slider is further moved in the vehicle rear direction, the movable panel performs a sliding operation together with the front portion slider and is pulled in to be positioned below the roof portion. Thus, the movable panel comes to be in the fully-opened state and the opening portion is released.

A drain slider extends in the vehicle width direction under a rear edge portion of the movable panel. An end portion of the drain slider in the vehicle width direction is provided at the guide rail in a movable manner in the vehicle front/rear direction. The drain slider is connected via a rod to the supporting member. A drain frame fixedly attached to an upper surface of the drain slider is configured to be positioned under the rear edge portion of the movable panel regardless of, for example, the sliding operation of the movable panel, thereby receiving water drops of, for example, rain.

Further, a stopper is fixedly attached to the guide rail at a rear side of the vehicle relative to the drain slider. The stopper is arranged so as to be in contact with the drain slider while the movable panel is in the fully-opened state. In other words, the roof apparatus is configured so that the drain slider is stopped from moving in the vehicle rear direction by coming in contact with the stopper while the movable panel is performing the sliding operation in the vehicle rear direction. Accordingly, a movement of the supporting member connected via the rod to the drain slider is stopped, and thus the movable panel stops in the fully opened-state.

According to the roof apparatus for the vehicle disclosed in the Patent reference 1, in order to stop the movable panel in the fully-opened state, stopping of the movement of the drain slider by the stopper is transmitted via the rod to the supporting member. In this case, the rod, which extends in the vehicle front/rear direction, is assumed to be arranged in an offset manner in the vehicle width direction relative to the supporting member or to the drain slider. Accordingly, in a course of transmitting the stopping of the drain slider by the stopper via the rod to the supporting member, the load transmission is once offset in the vehicle width direction at the rod, and thus movement of the roof apparatus when the drain slider stops may become unstable.

A need thus exists for a roof apparatus for a vehicle which is not susceptible to the drawback mentioned above.

SUMMARY

According to an aspect of this disclosure, a roof apparatus for a vehicle includes a function part arranged to be movable in a vehicle front/rear direction along a guide rail provided at an edge portion, in a vehicle width direction, of an opening portion formed at a roof portion of a vehicle body, the function part supporting a movable panel for opening and closing the opening portion, a drain channel extending in the vehicle width direction under a rear edge portion of the movable panel, the drain channel being arranged in a manner that an end portion, in the vehicle width direction, of the drain channel is movable along the guide rail in the vehicle front/rear direction, and a stopper provided at the guide rail at a rear side in the vehicle front/rear direction relative to the drain channel, wherein the stopper allows the drain channel to be in contact with the stopper for stopping a movement of the drain channel in the vehicle rear direction and the drain channel allows the function part to be in contact with the drain channel for stopping a movement of the function part in the vehicle rear direction while the movable panel performs an opening operation as the function part moves in the vehicle rear direction, and the drain channel includes an interposition portion including a contacting surface defined by a contact with the stopper and a contacted surface defined by a contact with the function part in a case where the movement of the drain channel is stopped by the stopper, and a projected image of the contacting surface in the vehicle front/rear direction and a projected image of the contacted surface in the vehicle front/rear direction are at least partly overlapped each other in the vehicle front/rear direction.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a side view illustrating the embodiment;

DETAILED DESCRIPTION

Figure 1:
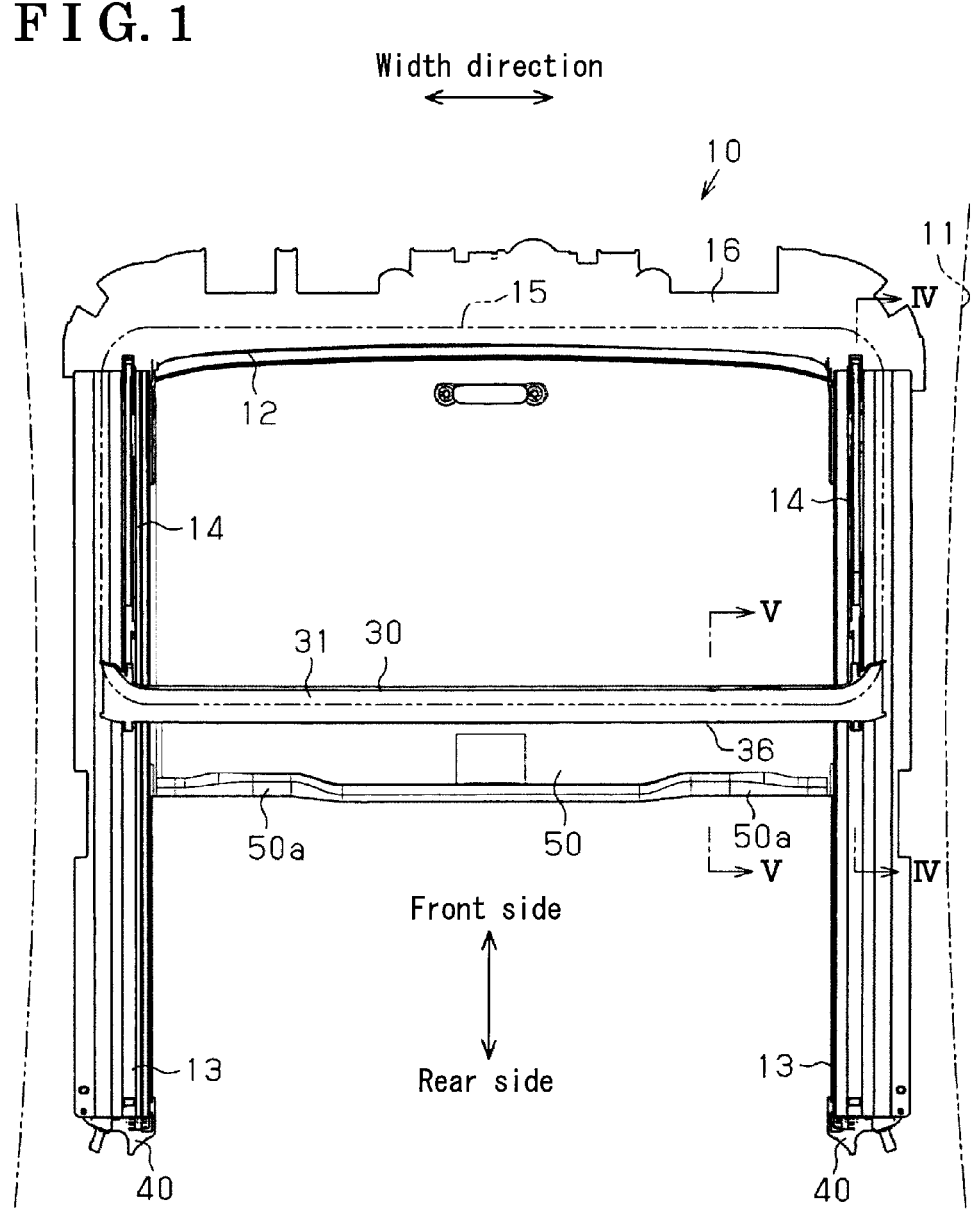
FIG. 1 is a plan view illustrating an embodiment disclosed here.

An embodiment of this disclosure will be explained with reference to FIGS. 1 to 7. As illustrated in FIG. 1, a sunroof apparatus 10 serving as a roof apparatus for a vehicle is mounted on a roof portion 11, at which an opening portion 12 having a substantially rectangular shape is formed, of a vehicle body. The sunroof apparatus 10 is provided with a guide rail 13, for example, a pair of guide rails 13, 13, fixedly arranged at edge portions of the opening portion 12 in a vehicle width direction (i.e., a width direction of a vehicle roof 11, that is, the roof portion 11). Each guide rail 13 is made of, for example, aluminum alloy extrusion and includes a constant cross-sectional configuration over a lengthwise direction of the guide rail 13. Each guide rail 13 extends in a vehicle front/rear direction (i.e., a front/rear direction of the vehicle roof 11).

Each guide rail 13 guides and supports a function part 14 so that the function part 14 is movable in the vehicle front/rear direction. At the function parts 14, 14, edge portions of a movable panel 15 in the vehicle width direction are fixedly supported in a manner that the movable panel 15 spans the function parts 14, 14 across the vehicle width direction. The movable panel 15 is made of, for example, glass, and is formed in a substantially rectangular shape. Front end portions of the guide rails 13, 13 are connected with each other via a front housing 16 extending in the vehicle width direction.

Each function part 14 causes the movable panel 15 to perform a sliding operation, a tilt-up operation and a tilt-down operation as the function part 14 moves along the corresponding guide rail 13 in the vehicle front/rear direction. The opening portion 12 is opened and closed by, for example, the sliding operation of the movable panel 15.

Figure 6:
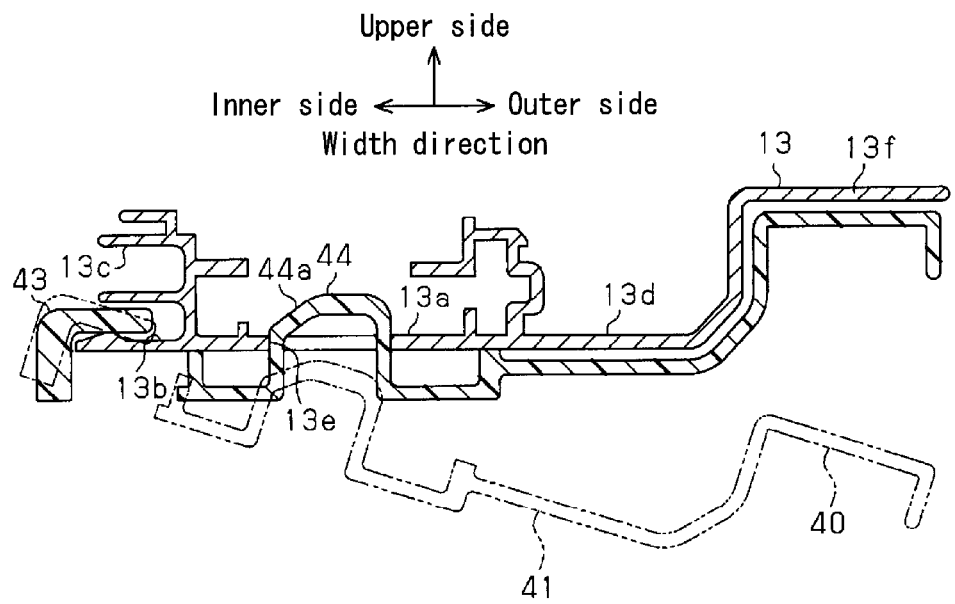
FIG. 6 is a cross-sectional view illustrating the embodiment.

More specifically, as illustrated in FIG. 6, each guide rail 13 includes a first rail portion 13a having a cross section substantially formed in a shape of a letter C opening upward in a vehicle up/down direction. Each guide rail 13 further includes a holding portion 13b arranged at an inner side in the vehicle width direction relative to the first rail portion 13a so as to be parallel to the first rail portion 13a and having a cross section substantially formed in a shape of a letter U opening inward in the vehicle width direction. Each guide rail 13 further includes a guide portion 13c arranged above the holding portion 13b so as to be parallel to the holding portion 13b and having a cross section substantially formed in a shape of a letter U opening inward in the vehicle width direction. Each guide rail 13 further includes a drain portion 13d provided at an outer side in the vehicle width direction relative to the first rail portion 13a so as to be parallel to the first rail portion 13a and having a cross section substantially formed in a shape of a letter U opening upward in the vehicle up/down direction. The first rail portion 13a, the holding portion 13b, the guide portion 13c and the drain portion 13d are formed in a manner that part of each of the above portions are shared with one another. Each guide rail 13 includes an attachment portion 13f formed in a flange shape extending from the drain portion 13d outwardly in the vehicle width direction.

As illustrated in FIG. 3, each function part 14 is provided with a rear shoe 21 guided and supported by the corresponding first rail portion 13a so as to be movable in the vehicle front/rear direction along the first rail portion 13a and a front shoe 22 guided and supported by the first rail portion 13a to be positioned forward in the vehicle front/rear direction relative to the rear shoe 21 so as to be movable in the vehicle front/rear direction along the first rail portion 13a. Each rear shoe 21 is connected to, for example, an electric motor so as to be driven to move in the vehicle front/rear direction along the corresponding guide rail 13 (the first rail portion 13a).

Each function part 14 includes a supporting member 23 which is, at a front end portion of the supporting member 23, journaled by a first supporting pin 24 formed at the front shoe 22. A central line of the first supporting pin 24 extends in the vehicle width direction (i.e., a direction perpendicular to the paper on which FIG. 3 is illustrated). The supporting member 23 extends in the vehicle front/rear direction and includes a guide hole 23a which is provided at a rear portion of the supporting member 23 relative to the first supporting pin 24 and is formed in a long hole shape. A second supporting pin 25 which is provided at the rear shoe 21 and of which central line extends in the vehicle width direction is connected to the guide hole 23a by insertion. Thus, the supporting member 23 is connected to the rear shoe 21 so as to be pivotable relative to the rear shoe 21 and movable in the vehicle front/rear direction along the guide hole 23a. The movable panel 15 is fixedly supported at the function parts 14, 14 at the supporting members 23, 23.

In a fully-closed state illustrated in FIG. 3 where the movable panel 15 (refer to FIG. 1) is fully closed, each guide hole 23a is inclined upwardly as a whole toward a rear portion of the vehicle. In the fully-closed state of the movable panel 15, the second supporting pin 25 of each rear shoe 21 is positioned in an intermediate portion of the guide hole 23a in a lengthwise direction thereof. Accordingly, in the fully-closed state of the movable panel 15, which is drawn with the solid lines in FIG. 4, each supporting member 23 is pushed upward by the corresponding second supporting pin 25 at the guide hole 23a as the rear shoe 21 moves in the vehicle front direction along the guide rail 13 (the first rail portion 13a), and thus the supporting member 23 pivots about the front end portion thereof (the first supporting pin 24) in the counter-clockwise direction when viewed in FIG. 4 as illustrated with the double-dotted lines in FIG. 4. At this time, the movable panel 15 performs the tilt-up operation, that is, a rear portion of the movable panel 15 moves upward relative to a front portion thereof. On the contrary, as each rear shoe 21 moves in the vehicle rear direction along the guide rail 13 (the first rail portion 13a) in the fully-closed state of the movable panel 15, the supporting member 23 is pushed downward by the second supporting pin 25 at the guide hole 23a, and thus the movable panel 15 performs the tilt-down operation, that is, the rear portion of the movable panel 15 moves downward relative to the front portion thereof as illustrated with the double-dotted lines in FIG. 4.

During the tilt operation of the movable panel 15, a movement, in the vehicle front/rear direction, of the front shoe 22 that is pushed by the supporting member 23 at the first supporting pin 24 is restricted by a known check mechanism. In a case where the second supporting pin 25 reaches an end (a rear end) of the guide hole 23a as the rear shoe 21 moves in the vehicle rear direction along the corresponding guide rail 13 (the first rail portion 13a), the tilt-down operation of the movable panel 15 is completed. At this time, the restriction by the known check mechanism on the movement of the front shoe 22 in the vehicle rear direction is released. Accordingly, in a case where the rear shoe 21 further moves in the vehicle rear direction along the corresponding guide rail 13 (the first rail portion 13a), the supporting member 23 and the front shoe 22 move together with each other in the vehicle rear direction, and thus the movable panel 15 performs the opening operation while remaining in a tilted-down state. Consequently, the movable panel 15 comes to be in a fully-opened state, thereby opening the opening portion 12.

On the other hand, in a case where the rear shoe 21 moves in the vehicle front direction along the corresponding guide rail 13 (the first rail portion 13a) in the fully-opened state of the movable panel 15, pivoting of the supporting member 23 about the front end portion thereof (the first supporting pin 24) is restricted by the known check mechanism. Thus, the supporting member 23 and the front shoe 22 move together with each other in the vehicle front direction, and the movable panel 15 performs the closing operation while remaining in the tilted-down state. In a case where the movable panel 15 returns to a state where the aforementioned tilt-down operation is completed, the restriction by the known check mechanism on the pivoting of the supporting member 23 is released and the movement of the front shoe 22 in the vehicle front/rear direction is restricted. Accordingly, in this state, in a case where the rear shoe 21 further moves in the vehicle front direction along the corresponding guide rail 13 (the first rail portion 13a), the supporting member 23 is pushed upward by the second supporting pin 25 at the guide hole 23a, and thus the movable panel 15 performs the tilt-up operation in which the rear portion of the movable panel 15 moves upward relative to the front portion of the movable panel 15 and returns to the fully-closed state.

As illustrated in FIG. 1, a drain channel 30 made of resin material into a long shape is arranged under a rear edge portion of the movable panel 15 to extend in the vehicle width direction. Each end portion of the drain channel 30 in the vehicle width direction is arranged behind the corresponding function part 14 so as to be movable in the vehicle front/rear direction along the corresponding guide rail 13 (the first rail portion 13a) and so as to be pivotable about an axial line extending in the vehicle width direction.

Figure 7:
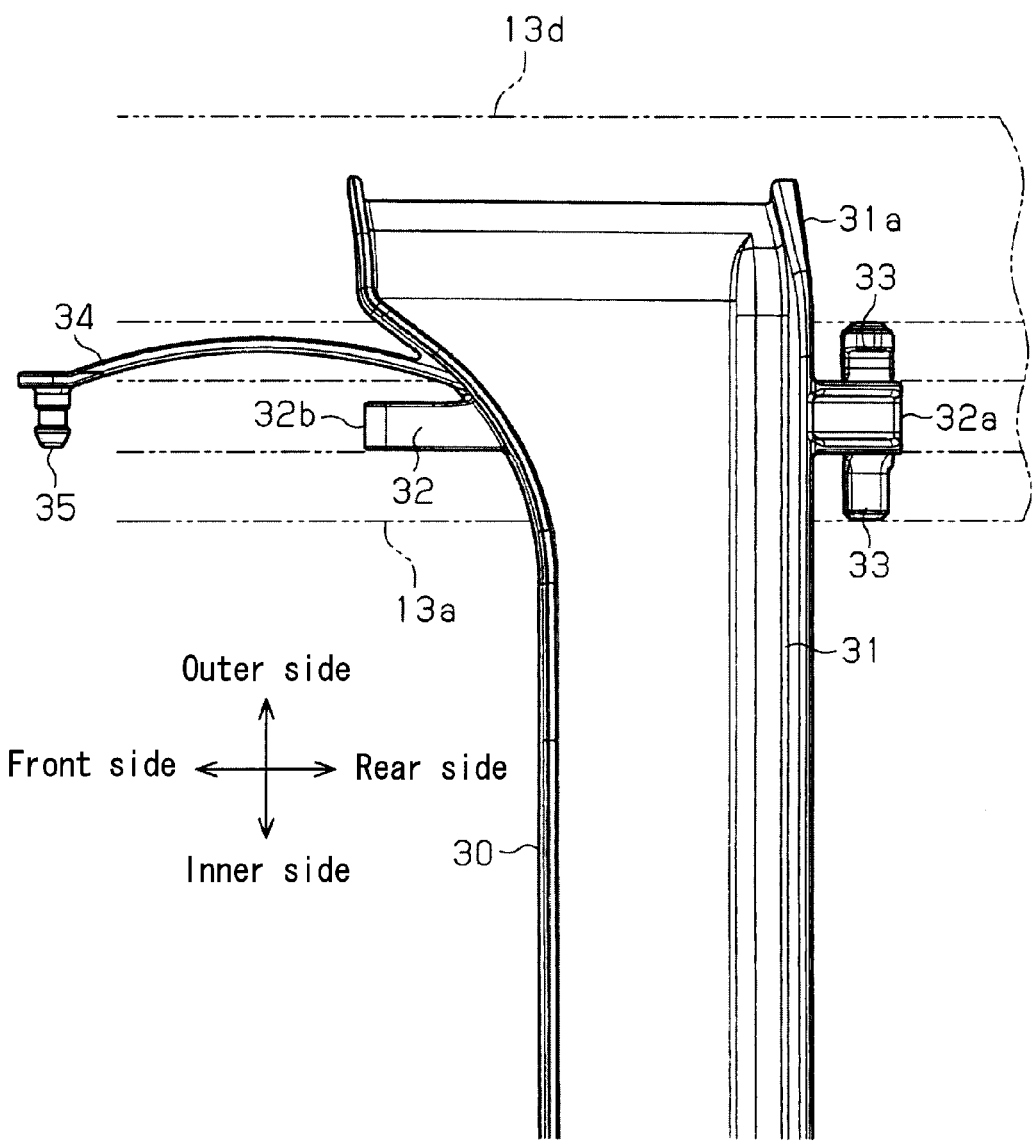
FIG. 7 is a plan view illustrating a drain channel of the embodiment.

More specifically, the drain channel 30 includes a channel portion 31 formed in a groove configuration having a substantial shape of a letter U, and connecting and spanning the guide rails 13, 13 (the drain portions 13d, 13d) across the vehicle width direction so that a communication is made between the guide rails 13, 13. As illustrated in FIG. 7, each end portion of the channel portion 31 in the vehicle width direction is formed to be widened toward the vehicle front direction above the corresponding drain portion 13d and to be inclined downwardly for defining a channel drain portion 31a. The drain channel 30 includes interposition portions 32, 32. More specifically, each interposition portion 32 is positioned under a portion of the channel portion 31, the portion corresponding to an inner side in the vehicle width direction of the channel drain portion 31a, and extends in the vehicle front/rear direction across the channel drain portion 31a. The interposition portion 32 is formed in a substantially rectangular-block shape extending in the vehicle front/rear direction and protruding from the channel portion 31 toward a front side and a rear side of the channel portion 31 in the vehicle front/rear direction. Each interposition portion 32 is configured to match a configuration of an upwardly-opening portion defined by the first rail portion 13a and is arranged to appear above the corresponding first rail portion 13a.

Each interposition portion 32 includes a supporting portion 33 provided at a lower portion of a rear end portion of the interposition portion 32. Each supporting portion 33 is formed in a shape of a pair of pins and protrudes toward the both sides in the vehicle width direction inside the first rail portion 13a. The drain channel 30 is supported by the first rail portions 13a, 13a at the supporting portions 33, 33 so as to be movable in the vehicle front/rear direction along the first rail portions 13a, 13a and so as to be pivotable about the axial line extending in the vehicle width direction. Each interposition portion 32 includes a hole portion opening downwardly and is formed in a substantially rectangular-box shape. Each interposition portion 32 includes a second rear end surface 32a formed in a substantially rectangular shape and a front end surface 32b formed in a substantially rectangular shape.

Figure 4:
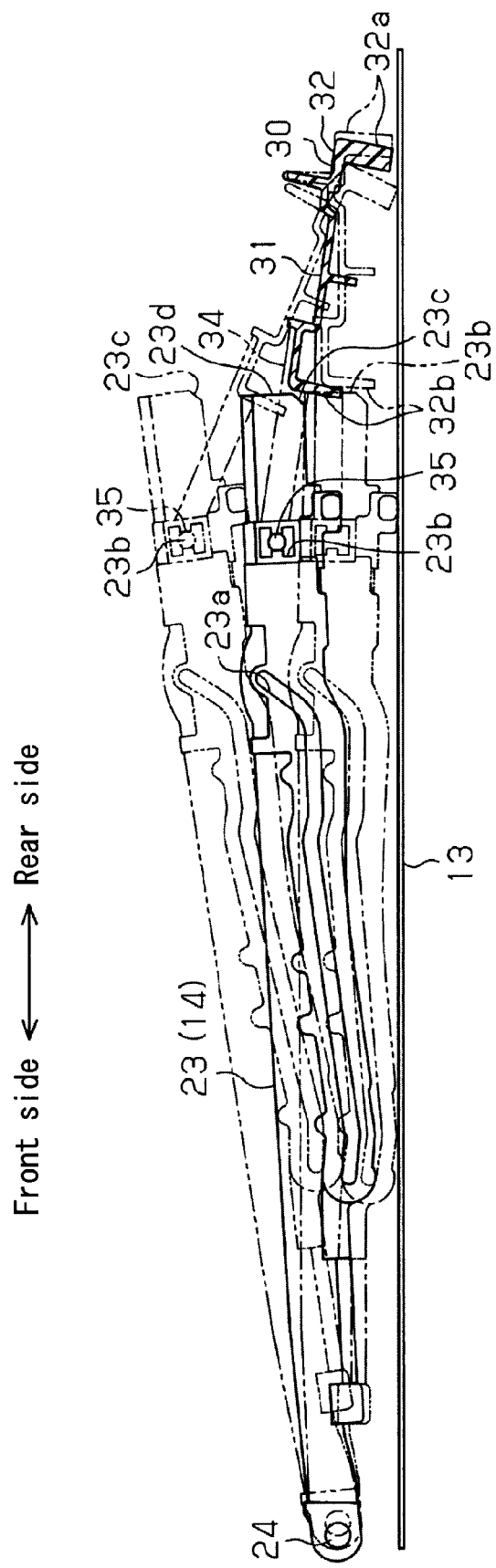
FIG. 4 is a cross-sectional view taken along line IV-IV in FIG. 1.

The drain channel 30 includes an arm portion 34 which is provided adjacent to each interposition portion 32 at the outer side in the vehicle width direction and is formed in a long shape extending toward the front side, that is, extending in the vehicle front/rear direction from the front end of the channel portion 31. The drain channel 30 further includes a connection portion 35 formed in a pin shape protruding from the front end portion of the arm portion 34 inwardly in the vehicle width direction. As illustrated in FIG. 4, the connection portion 35 of the arm portion 34 is supported at a connection hole 23b provided at a rear end portion of the supporting member 23 so that the arm portion 34 is connected to the supporting member 23 so as to be rotatable relative to the supporting member 23. Thus, for example, in a case where the supporting member 23 pivots about the front end portion thereof (the first supporting pin 24) in the counter-clockwise direction when viewed in FIG. 4 during the tilt-up operation of the movable panel 15, the arm portion 34 (the drain channel 30) pivots in the clockwise direction when viewed in FIG. 4 in an interlocked manner with pivoting of the arm portion 34. In a case where the supporting member 23 pivots about the front end portion thereof (the first supporting pin 24) in the clockwise direction when viewed in FIG. 4 during the tilt-down operation of the movable panel 15, the arm portion 34 (the drain channel 30) pivots in the counter-clockwise direction when viewed in FIG. 4 in the interlocked manner with the pivoting of the arm portion 34.

A chamfered portion 23c is formed at a lower portion of a facing portion (that is, the lower portion of the rear end portion) of each supporting member 23 which faces the corresponding interposition portion 32 in the vehicle front/rear direction, which is for preventing interference between the supporting member 23 and the interposition portion 32 during the tilt operation, specifically, the tilt-up operation of the movable panel 15, at the same time, for allowing a clearance in the vehicle front/rear direction between the supporting member 23 and the interposition portion 32 (the front end surface 32b) to be reduced. A first rear end surface 23d of the supporting member 23, and the second rear end surface 32a and the front end surface 32b of the interposition portion 32 are set to rise at a substantially right angle relative to a direction in which the guide rails 13, 13 extend when the movable panel 15 is in the tilted-down state (including while the movable panel 15 performs the sliding operation).

On the other hand, in a case where the supporting members 23, 23 move in the vehicle rear direction during the sliding operation of the movable panel 15 in the vehicle rear direction, the drain channel 30, which is pushed via the arm portions 34, 34 by the supporting members 23, 23, moves in the vehicle rear direction together with the supporting members 23, 23. In a case where the supporting members 23, 23 move in the vehicle front direction during the sliding operation of the movable panel 15 in the vehicle front direction, the drain channel 30, which is pulled via the arm portions 34, 34 by the supporting members 23, 23, moves in the vehicle front direction together with the supporting members 23, 23. As illustrated in FIG. 7, each arm portion 34 is bent in a bow shape protruding outwardly as a whole in the vehicle width direction. However, the arm portion 34 includes enough rigidity so that the first rear end surface 23d of the supporting member 23 is not pressed against the front end surface 32b of the interposition portion 32 by a flexural deformation of the arm portion 34 during the aforementioned normal operations.

Figure 5:
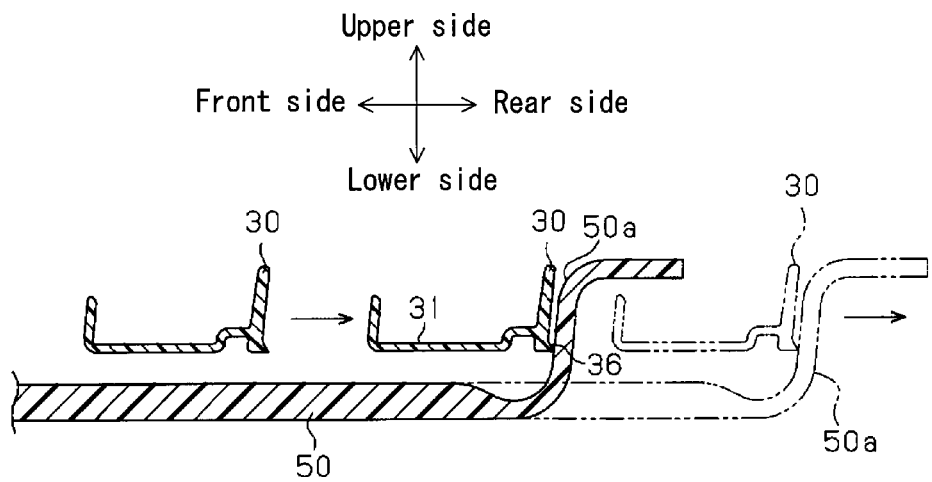
FIG. 5 is a cross-sectional view taken along line V-V in FIG. 1.

At the guide portion 13c of each guide rail 13, edge portions of a sunshade 50 in the vehicle width direction are slidably supported as illustrated in FIG. 1. The sunshade 50 serving as a sunshade panel is formed in a substantially rectangular shape and is for opening and closing the opening portion 12 at an inside of a vehicle cabin. The sunshade 50 includes engaging walls 50a, 50a each provided to stand upward as illustrated in FIG. 5 at a rear end edge of the sunshade 50, the rear end edge is arranged rear side relative to the drain channel 30 (the channel portion 31) in the vehicle front/rear direction. The engaging walls 50a, 50a are provided at both end portions of the sunshade 50, in the vehicle width direction, which are interposed between the guide rails 13, 13. On the other hand, the channel portion 31 of the drain channel 30 which is configured to move above the sunshade 50 (that is, on the first rail portion 13a) includes a thin portion 36 formed in a shape of an edge protruding in the vehicle rear direction along a bottom surface of the channel portion 31. Thus, in a case where the drain channel 30 moves in the vehicle rear direction together with the movable panel 15 as the movable panel 15 performs the sliding operation in the vehicle rear direction, the sunshade 50 whose engaging walls 50a, 50a are pushed by the thin portion 36 moves together with the drain channel 30 in the vehicle rear direction. At this time, the drain channel 30 pushes the engaging walls 50a, 50a of the sunshade 50 in a manner that a load is concentrated at the thin portion 36, thereby restricting a faulty status where, for example, the drain channel 30 rides over the engaging walls 50a, 50a and thus the sunshade 50 remains without moving.

Figure 2:
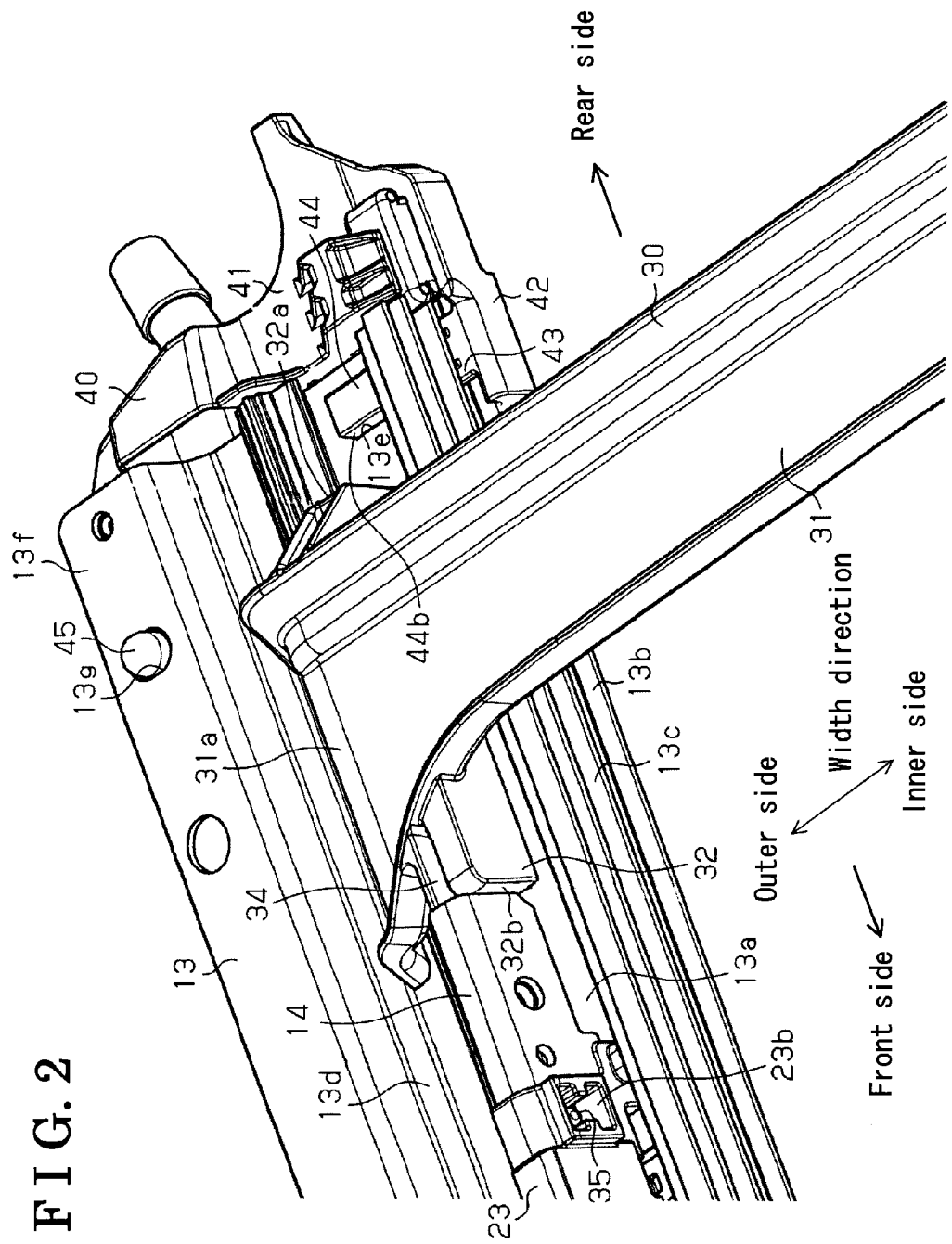
FIG. 2 is a perspective view illustrating the embodiment.

As illustrated in FIG. 2, a drain piece 40 made of resin material and serving as a drain member is fixedly mounted on a rear end of each guide rail 13. Each drain piece 40 includes a body portion 41 attached to an under surface of a rear end of the corresponding guide rail 13. The body portion 41 closes rear ends of the corresponding first rail portion 13a, the corresponding holding portion 13b and the corresponding guide portion 13c while the body portion 41 is in communication with a rear end of the corresponding drain portion 13d. Each drain piece 40 includes an extending portion 42 extending from a portion of the body portion 41, the portion positioned at the inner side in the vehicle width direction, toward the vehicle front direction along the corresponding guide rail 13. Each drain piece 40 also includes a latch portion 43 protruding from a front end of the extending portion 42 outwardly in the vehicle width direction so as to be fitted in and engaged at the corresponding holding portion 13b.

At a rear end portion of each first rail portion 13a, a first fitting hole 13e having a substantially rectangular shape is provided so as to be positioned rearward in the vehicle front/rear direction relative to the corresponding interposition portion 32 of the drain channel 30. A first fitting protruding portion 44 having a block shape is protrudingly provided at each body portion 41 so as to upwardly fit into the corresponding first fitting hole 13e, thereby serving as a stopper. Thus, the first fitting protruding portion 44 is integrally formed with each drain piece 40. Further, a second fitting hole 13g having a substantially circular shape is provided at a rear end of the attachment portion 13f. A second fitting protruding portion 45 having a substantially cylindrical shape is protrudingly provided at each body portion 41 so as to fit upwardly into the corresponding second fitting hole 13g.

Each drain piece 40 is configured to be temporarily assembled to the corresponding guide rail 13 in a manner that the latch portion 43 is fitted in and engaged at the holding portion 13b, and the first and second fitting protruding portions 44 and 45 fit upwardly into the first and second fitting holes 13e and 13g, respectively. The drain pieces 40, 40, in the temporarily-assembled state, are fastened to the guide rails 13, 13 by a fastening mechanism, and thus the drain pieces 40, 40 come to be securely mounted on the guide rails 13, 13. The drain pieces 40, 40 may be attached to the guide rails 13, 13 by adhesion or bonding interposed between each drain piece 40 and the corresponding guide rail 13.

When temporarily assembling each drain piece 40 to the corresponding guide rail 13, the drain piece 40 is tilted downwardly as illustrated in FIG. 6 and the latch portion 43 is fitted in and engaged at the corresponding holding portion 13b while keeping the drain piece 40 tilted. In this state, the drain piece 40 is pivoted about the latch portion 43 in a manner that an end section of the drain piece 40 is lifted up so that the first fitting protruding portion 44 comes to be fitted in the first fitting hole 13e. By pivoting the drain piece 40 as described above, the second fitting protruding portion 45 comes to be fitted in the second fitting hole 13g.

A slope portion 44a is provided at an upper end portion of each first fitting protruding portion 44 at the inner side in the vehicle width direction, that is, the upper end portion positioned in a vicinity of a center of the pivoting. This is for preventing the first fitting protruding portion 44 from interfering with an inner wall surface of the first fitting hole 13e while the drain piece 40 is pivoted about the latch portion 43. Each first fitting protruding portion 44 includes a front end surface in the vehicle front/rear direction which is formed in a substantially trapezoidal shape and which defines a receiving surface 44b receiving a load from the corresponding interposition portion 32 while the interposition portion 32 (the second rear end surface 32a) is in contact with the receiving surface 44b. Each receiving surface 44b is set to stand at a substantially right angle relative to a direction in which the guide rail 13 extends.

While the movable panel 15, which includes the aforementioned structure, is performing the sliding operation in the vehicle rear direction, in a case where the drain channel 30 moves together with the supporting members 23, 23 in the vehicle rear direction beyond a normal stop position, the second rear end surface 32a of the interposition portion 32 comes in contact with the receiving surface 44b of the first fitting protruding portion 44, and thus the drain channel 30 is stopped from moving. In a case where the drain channel 30 stops moving in the vehicle rear direction, the first rear end surface 23d of each supporting member 23 comes in contact with the front end surface 32b of the corresponding interposition portion 32 while each supporting member 23 allows the corresponding arm portion 34 to be flexed. Thus, the supporting members 23, 23 stop from moving. Accordingly, an opening operation of the movable panel 15 is stopped and the movable panel 15 is prevented from being excessively opened.

In the embodiment, as illustrated in FIG. 2, each interposition portion 32 (the second rear end surface 32a) of the drain channel 30 includes a contacting surface defined by a contact with the corresponding first fitting protruding portion 44 (the receiving surface 44b), and each interposition portion 32 (the front end surface 32b) includes a contacted surface defined by a contact with the corresponding supporting member 23 (the first rear end surface 23d). A projected image of the contacting surface in the vehicle front/rear direction and a projected image of the contacted surface in the vehicle front/rear direction are set to be at least partly overlapped each other in the vehicle front/rear direction. With the aforementioned structure, in a case where a movement of each supporting member 23 is stopped via the drain channel 30 (the corresponding interposition portion 32) by the corresponding first fitting protruding portion 44, the load generated at that time is supported on a single straight line in the vehicle front/rear direction via the corresponding interposition portion 32.

Next, an operation of the embodiment will be explained hereunder. First, a watertight operation will be explained. For example, water drops dropped from a rear end edge of the movable panel 15 fall into the channel portion 31 of the drain channel 30. The water drops fallen into the channel portion 31 flow in a direction in which the channel portion 31 extends and flow from the channel drain portion 31a into the drain portion 13d of the guide rail 13. The water drops fallen into the drain portion 13d flow along the drain portion 13d in, for example, the vehicle rear direction and are discharged via the body portion 41 of the drain piece 40 to an outside. Thus, for example, water drops are prevented from entering into the inside of the vehicle cabin.

Next, the opening operation of the movable panel 15 will be explained. As described above, in the fully-closed state of the movable panel 15, in a case where each rear shoe 21 moves in the vehicle rear direction, the movable panel 15 performs the opening operation after performing the tilt-down operation. Thus, the movable panel 15 comes to be in the fully-opened state, and thus the opening portion 12 is opened. At the same time, the sunshade 50 pushed by the drain channel 30 performs the opening operation together with the movable panel 15. A stop control of the movable panel 15 (a stop control of the electric motor) in the fully-opened state is electrically performed on the basis of a position of the movable panel 15 detected by a position sensor. Accordingly, the sunroof apparatus 10 of this embodiment is configured so that the movable panel 15 normally stops before the drain channel 30 and other related parts are stopped from moving by the first fitting protruding portions 44, 44.

On the other hand, in a case where the movable panel 15 does not stop at the normal stop position for some reason, the movement of each supporting member 23 is stopped via the drain channel 30 (the interposition portion 32) by the corresponding first fitting protruding portion 44, and thus the opening operation of the movable panel 15 is stopped. Accordingly, the movable panel 15 is prevented from being excessively opened. At this time, each first fitting protruding portion 44 supports the load, which is from the corresponding supporting member 23, on the single straight line in the vehicle front/rear direction via the interposition portion 32, and thus movement of the sunroof apparatus 10 when the movable panel 15 is stopped is stabilized.

As explained above, following effects and advantages are obtained according to the aforementioned embodiment. (1) According to the embodiment, while the movable panel 15 performs the opening operation as the function parts 14, 14 move in the vehicle rear direction, the movement of the drain channel 30 in the vehicle rear direction is stopped in a case where the drain channel 30 comes in contact with the first fitting protruding portions 44, 44 at the interposition portions 32, 32, and the movement of each function part 14 in the vehicle rear direction is stopped in a case where the function parts 14, 14 come in contact with the interposition portions 32, 32, and thus, the opening operation of the movable panel 15 is stopped. Accordingly, the movable panel 15 is prevented from being excessively opened. At this time, at each interposition portion 32 of the drain channel 30, the contacting surface defined by the contact with the corresponding first fitting protruding portion 44 and the contacted surface defined by the contact with the corresponding function part 14 (the supporting member 23) are set in a manner that the projected image of the contacting surface in the vehicle front/rear direction and the projected image of the contacted surface in the vehicle front/rear direction are at least partly overlapped each other in the vehicle front/rear direction. Thus, in a case where the movement of each function part 14 is stopped via the drain channel 30 (the corresponding interposition portion 32) by the corresponding first fitting protruding portion 44, the load generated at that time is supported via the corresponding interposition portion 32 on the single straight line in the vehicle front/rear direction. Accordingly, the movement of the sunroof apparatus 10 when the function parts 14, 14 are stopped is stabilized.

In addition, the interposition portions 32, 32 are provided integrally with the drain channel 30, and thus an increase of the number of the parts is restricted. (2) According to the embodiment, during normal opening/closing operation of the movable panel 15, the drain channel 30 and the function parts 14, 14 move in an interlocked manner with each other by means of the arm portions 34, 34. The arm portions 34, 34 are flexed only in a case where the movement of the drain channel 30 is stopped by the first fitting protruding portions 44, 44, thereby allowing the function parts 14, 14 to come in contact with the contacted surfaces of the drain channel 30. Consequently, it is restricted that the arm portions 34, 34 are always flexed during the opening operation of the movable panel 15.

(3) According to the embodiment, in a case where each function part 14 (the supporting member 23) pivots about the front end portion thereof relative to the corresponding guide rail 13 so that the movable panel 15 performs the tilt operation, the drain channel 30 pivotably connected to the function parts 14, 14 at the arm portions 34, 34 pivots relative to the guide rails 13, 13 in the interlocked manner with pivoting of the function parts 14, 14. At this time, between each interposition portion 32 and the corresponding function part 14 where the interposition portion 32 and the corresponding function part 14 face each other in the vehicle front/rear direction, the clearance in the vehicle front/rear direction for allowing each of the interposition portion 32 and the corresponding function part 14 to pivot is needed. On the other hand, in a case where the movement of each function part 14 in the vehicle rear direction is stopped by the corresponding first fitting protruding portion 44, when the function part 14 comes in contact with the drain channel 30 so as to stop from moving in the vehicle rear direction, the arm portion 34 is flexed corresponding to the clearance. Accordingly, it is more ideal that the aforementioned clearance is reduced, that is, a smaller clearance is ideal. By providing the chamfered portion 23c at each function part 14 at the portion facing the corresponding interposition portion 32 in the vehicle front/rear direction (that is, the lower portion of the rear end portion), the interference between the interposition portion 32 and the function part 14 is prevented, and at the same time the clearance is reduced. Accordingly, generation of abnormal noises and/or malfunction which may be caused by the interference between the interposition portion 32 and the function part 14 is prevented.

(4) According to the embodiment, the first fitting protruding portion 44 serving as the stopper is integrally formed with the existing drain piece 40, and thus an increase of the number of the parts is restricted. In other words, the first fitting protruding portion 44 may be provided by changing the shape or configuration of the existing part without increasing the number of the parts.

(5) According to the embodiment, each arm portion 34 of the drain channel 30 is preliminarily flexed, that is, bent, and formed in the bow shape, thereby reducing a buckling load of the arm portion 34, and thus generation of an excessive stress is restricted. In addition, a posture of each arm portion 34 while being flexed and deformed is guided, and thus, for example, interference that might otherwise occur between the arm portion 34 and peripheral parts during the flexure and deformation of the arm portion 34 is prevented.

(6) According to the embodiment, the drain channel 30 includes the thin portion 36 protruding in the vehicle rear direction in a manner that a thickness thereof in the vehicle up/down direction gradually decreases toward the vehicle rear direction. The thin portion 36 is configured to be in contact with the sunshade 50 while the drain channel 30 moves in the vehicle rear direction. Thus, the load is concentrated at the thin portion 36 while the sunshade 50 is moving, thereby making it difficult for the drain channel 30 to ride over a surface of the sunshade 50 with which the drain channel 30 is in contact (the engaging wall 50*a*).

The aforementioned embodiment may be modified as follows. Instead of or in addition to the chamfered portion 23*c* formed at each supporting member 23 according to the aforementioned embodiment, a chamfered portion may be formed at an upper portion of a front end portion of each interposition portion 32 (that is, the portion facing the corresponding supporting member 23 in the vehicle front/rear direction). Alternatively, a chamfered portion may be provided at an arbitrary portion of at least one of the interposition portion 32 at the portion facing the corresponding function part 14, and the function part 14 (the supporting member 23) at the portion facing the corresponding interposition portion 32.

Each first fitting protruding portion 44 of the aforementioned embodiment may be a separate structure for an exclusive purpose and be provided separately from the corresponding drain piece 40. According to the aforementioned embodiment, each first fitting protruding portion 44 is integrally formed with the corresponding drain piece 40, however, each first fitting protruding portion 44 may be integrally formed with, for example, the corresponding guide rail 13.

Each arm portion 34 of the aforementioned embodiment is preliminarily flexed to be formed in the bow shape, however, each arm portion 34 may include, for example, a linear shape in a case where the arm portion 34 withstands the buckling load. The structure of each function part 14, which is related to the opening/closing operation of the movable panel 15, is an example. The guide hole 23*a* may be provided at each rear shoe 21 and the second supporting pin 25, which is to be inserted in the guide hole, may be provided at the corresponding supporting member 23. Alternatively, a series of the operations of the movable panel 15 (that is, the tilt-up operation, the tilt-down operation and the sliding operation) may be achieved only by moving the function parts 14, 14 in the vehicle rear direction.

According to the aforementioned embodiment, the sunroof apparatus 10 includes the function parts 14, 14 which are arranged to be movable in the vehicle front/rear direction along the guide rails 13, 13 provided at the edge portions, in the vehicle width direction, of the opening portion 12 formed at the roof portion 11 of the vehicle body and which support the movable panel 15 for opening and closing the opening portion 12, the drain channel 30 extending in the vehicle width direction under the rear edge portion of the movable panel 15, the drain channel 30 being arranged in a manner that the end portion, in the vehicle width direction, of the drain channel 30 is movable along the guide rails 13, 13 in the vehicle front/rear direction, and the first fitting protruding portions 44, 44 provided at the guide rails 13, 13 at the rear side in the vehicle front/rear direction relative to the drain channel 30, wherein the first fitting protruding portions 44, 44 allow the drain channel 30 to be in contact with the first fitting protruding portions 44, 44 for stopping the movement of the drain channel 30 in the vehicle rear direction and the drain channel 30 allows the function parts 14, 14 to be in contact with the drain channel 30 for stopping the movement of the function parts 14, 14 in the vehicle rear direction while the movable panel 15 performs the opening operation as the function parts 14, 14 move in the vehicle rear direction, and the drain channel 30 includes the interposition portions 32, 32 each including the contacting surface defined by the contact with the first fitting protruding portion 44 and the contacted surface defined by the contact with the function part 14 in a case where the movement of the drain channel 30 is stopped by the first fitting protruding portion 44, and the projected image of the contacting surface in the vehicle front/rear direction and the projected image of the contacted surface in the vehicle front/rear direction are at least partly overlapped each other in the vehicle front/rear direction.

According to the above described structure, while the movable panel 15 performs the opening operation as the function parts 14, 14 move in the vehicle rear direction, the movement of the drain channel 30 in the vehicle rear direction is stopped in a case where the drain channel 30 comes in contact with the first fitting protruding portions 44, 44 at the interposition portions 32, 32, and the movement of each function part 14 in the vehicle rear direction is stopped in a case where the function parts 14, 14 come in contact with the interposition portions 32, 32. Accordingly, the opening operation of the movable panel 15 is stopped, and consequently the movable panel 15 is prevented from being excessively opened. At this time, at each interposition portion 32 of the drain channel 30, the contacting surface defined by the contact with the first fitting protruding portion 44 and the contacted surface defined by the contact with the function part 14 are set in a manner that the projected image of the contacting surface in the vehicle front/rear direction and the projected image of the contacted surface in the vehicle front/rear direction are at least partly overlapped each other in the vehicle front/rear direction. Thus, in a case where the movement of each function part 14 is stopped via the drain channel 30 (the corresponding interposition portion 32) by the corresponding first fitting protruding portion 44, the load generated at that time is supported via the corresponding interposition portion 32 on the single straight line in the vehicle front/rear direction. Accordingly, the movement of the sunroof apparatus 10 when the function parts 14, 14 are stopped is stabilized.

According to the aforementioned embodiment, the movement of the sunroof apparatus 10 when the opening operation of the movable panel 15 is stopped via the drain channel 30 is stabilized.

According to the aforementioned embodiment, the drain channel 30 includes the arm portions 34, 34 extending in the vehicle front/rear direction and connected to the function parts 14, 14, and the drain channel 30 allows the function parts 14, 14 to be in contact with the drain channel 30 and stops the function parts 14, 14 from moving in the vehicle rear direction in a case where the movement of the drain channel 30 is stopped by the first fitting protruding portions 44, 44 and the arm portions 34, 34 are flexed.

According to the above described structure, during the normal opening/closing operation of the movable panel 15, the drain channel 30 and the function parts 14, 14 move in the interlocked manner with each other by means of the arm portions 34, 34. The arm portions 34, 34 are flexed only in a case where the movement of the drain channel 30 is stopped by the first fitting protruding portions 44, 44, thereby allowing the function parts 14, 14 to come in contact with the contacted surfaces of the drain channel 30. Consequently, it is restricted that the arm portions 34, 34 always come to be flexed during the opening operation of the movable panel 15.

According to the aforementioned embodiment, the function parts 14, 14 are arranged pivotably about the front end portion of the function parts 14, 14 relative to the guide rails 13, 13 for allowing the movable panel 15 to perform the tilt operation, the drain channel 30 is arranged pivotably relative to the guide rails 13, 13 and is pivotably connected to the function parts 14, 14 at the arm portions 34, 34, at least one of the facing portion of each interposition portion 32 which faces the corresponding function part 14 in the vehicle front/rear direction and the facing portion of each function part 14 which faces the corresponding interposition portion 32 in the vehicle front/rear direction includes the chamfered portion 23c for preventing the interference between the interposition portion 32 and the function part 14 during the tilt operation of the movable panel 15.

According to the above described structure, in a case where each function part 14 pivots about the front end portion thereof relative to the corresponding guide rail 13 so that the movable panel 15 performs the tilt operation, the drain channel 30 pivotably connected at the arm portions 34, 34 to the function parts 14, 14 pivots relative to the guide rails 13, 13 in the interlocked manner with the pivoting of the function parts 14, 14. At this time, between each interposition portion 32 and the corresponding function part 14, where the interposition portion 32 and the corresponding function part 14 face each other in the vehicle front/rear direction, the clearance in the vehicle front/rear direction for allowing each of the interposition portion 32 and the corresponding function part 14 to pivot is needed. On the other hand, in a case of stopping the movement by means of the first fitting protruding portion 44, in a case where the movement of each function part 14 in the vehicle rear direction is stopped by allowing the function part 14 to come in contact with the drain channel 30, the corresponding arm portion 34 is flexed corresponding to the clearance. Accordingly, it is more ideal that the aforementioned clearance is reduced. By providing the chamfered portion 23c at at least one of the interposition portion 32 at the portion facing the corresponding function part 14 in the vehicle front/rear direction and the function part 14 at the portion facing the corresponding interposition portion 32 in the vehicle front/rear direction, the interference between the interposition portion 32 and the function part 14 is prevented, and at the same time the aforementioned clearance is reduced.

According to the aforementioned embodiment, the first fitting protruding portions 44, 44 are integrally formed with the drain pieces 40, 40 which are connected to the rear end of the guide rails 13, 13 and which are in communication with the drain portions 13d, 13d provided at the guide rails 13, 13.

According to the above described structure, the first fitting protruding portion 44 is integrally formed with the existing drain piece 40 that is in communication with the corresponding drain portion 13d of the guide rail 13, and thus the increase of the number of the parts is restricted.

According to the aforementioned embodiment, the first fitting protruding portions 44, 44 are integrally formed with the guide rails 13, 13.

According to the above described structure, each first fitting protruding portion 44 is integrally formed with the existing guide rail 13, and thus the increase of the number of the parts is restricted.

According to the aforementioned embodiment, the drain channel 30 includes the thin portions 36, 36 protruding in the vehicle rear direction and formed in a manner that the thickness of the thin portions 36, 36 gradually decreases toward the vehicle rear direction, and the thin portions 36, 36 are configured to be in contact with the sunshade 50 while the drain channel 30 moves in the vehicle rear direction.

According to the above described structure, the sunshade 50 is moved while the load is concentrated at the thin portions 36, 36, thereby making it difficult for the drain channel 30 to ride over the surface of the sunshade 50 with which the drain channel 30 is in contact.

According to the aforementioned embodiment, the arm portions 34, 34 are formed in the bow shape.

According to the above described structure, each arm portion 34 of the drain channel 30 is preliminarily flexed, that is, bent to be formed in the bow shape, thereby reducing the buckling load of the arm portion 34, and thus generation of the excessive stress is restricted. In addition, the posture of each arm portion 34 while being flexed and deformed is guided, and thus, for example, the interference that might otherwise occur between the arm portion 34 and the peripheral parts during the flexure and deformation of the arm portion 34 is prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
a function part arranged to be movable in a vehicle front/rear direction along a guide rail provided at an edge portion, in a vehicle width direction, of an opening portion formed at a roof portion of a vehicle body, the function part supporting a movable panel for opening and closing the opening portion;
a drain channel extending in the vehicle width direction under a rear edge portion of the movable panel, the drain channel being arranged in a manner that an end portion, in the vehicle width direction, of the drain channel is movable along the guide rail in the vehicle front/rear direction; and
a stopper provided at the guide rail at a rear side in the vehicle front/rear direction relative to the drain channel, wherein
the stopper allows the drain channel to be in contact with the stopper for stopping a movement of the drain channel in the vehicle rear direction and the drain channel allows the function part to be in contact with the drain channel for stopping a movement of the function part in the vehicle rear direction while the movable panel performs an opening operation as the function part moves in the vehicle rear direction,
the drain channel includes an interposition portion including a contacting surface defined by a contact with the stopper and a contacted surface defined by a contact with the function part in a case where the movement of the drain channel is stopped by the stopper, and a projected image of the contacting surface in the vehicle front/rear direction and a projected image of the contacted surface in the vehicle front/rear direction are at least partly overlapped each other in the vehicle front/rear direction,
the drain channel includes an arm portion extending in the vehicle front/rear direction and connected to the function part,
the drain channel allows the function part to be in contact with the drain channel and stops the function part from moving in the vehicle rear direction in a case where the movement of the drain channel is stopped by the stopper and the arm portion is flexed,
the function part is arranged pivotably about a front end portion of the function part relative to the guide rail for allowing the movable panel to perform a tilt operation, the drain channel is arranged pivotably relative to the guide rail and is pivotably connected to the function part at the arm portion, and at least one of a facing portion of the interposition portion which faces the function part in the vehicle front/rear direction and a facing portion of the function part which faces the interposition portion in the vehicle front/rear direction includes a chamfered portion for preventing interference between the interposition portion and the function part during the tilt operation of the movable panel.

2. The roof apparatus for the vehicle according to claim 1, wherein the stopper is integrally formed with a drain member which is connected to a rear end of the guide rail and which is in communication with a drain portion provided at the guide rail.

3. The roof apparatus for the vehicle according to claim 1, wherein the stopper is integrally formed with the guide rail.

4. The roof apparatus for the vehicle according to claim 1, wherein the arm portion is formed in a bow shape.

5. A roof apparatus for a vehicle, comprising:

a function part arranged to be movable in a vehicle front/rear direction along a guide rail provided at an edge portion, in a vehicle width direction, of an opening portion formed at a roof portion of a vehicle body, the function part supporting a movable panel for opening and closing the opening portion;

a drain channel extending in the vehicle width direction under a rear edge portion of the movable panel, the drain channel being arranged in a manner that an end portion, in the vehicle width direction, of the drain channel is movable along the guide rail in the vehicle front/rear direction; and a stopper provided at the guide rail at a rear side in the vehicle front/rear direction relative to the drain channel, wherein the stopper allows the drain channel to be in contact with the stopper for stopping a movement of the drain channel in the vehicle rear direction and the drain channel allows the function part to be in contact with the drain channel for stopping a movement of the function part in the vehicle rear direction while the movable panel performs an opening operation as the function part moves in the vehicle rear direction, the drain channel includes an interposition portion including a contacting surface defined by a contact with the stopper and a contacted surface defined by a contact with the function part in a case where the movement of the drain channel is stopped by the stopper, and a projected image of the contacting surface in the vehicle front/rear direction and a projected image of the contacted surface in the vehicle front/rear direction are at least partly overlapped each other in the vehicle front/rear direction, and the drain channel includes a thin portion protruding in the vehicle rear direction and formed in a manner that a thickness of the thin portion gradually decreases toward the vehicle rear direction, and the thin portion is configured to be in contact with a sunshade panel while the drain channel moves in the vehicle rear direction.

* * * * *